(12) United States Patent
Havens

(10) Patent No.: US 6,321,181 B1
(45) Date of Patent: Nov. 20, 2001

(54) DEVICE AND METHOD FOR PARALLEL SIMULATION

(75) Inventor: Joseph Harold Havens, Musashino (JP)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/138,701

(22) Filed: Aug. 24, 1998

(51) Int. Cl.[7] .............................. G06F 17/50; G06G 7/62
(52) U.S. Cl. ................... 703/13; 703/6; 709/101; 709/102
(58) Field of Search .................... 703/6, 7, 13, 21, 703/22, 23; 709/100, 101, 102, 103, 104, 105, 106, 107, 108

(56) References Cited

U.S. PATENT DOCUMENTS 5,715,184   2/1998  Tyler et al. .

OTHER PUBLICATIONS

SpeedSim by Quickturn, pp. 1–8, Jun. 5, 1998.
Platform products, pp. 1–3, Jun. 3, 1998.
Platform products, pp. 1–2, Jun. 3, 1998.
Platform products, pp. 1–5, Jun. 3, 1998.
Brunett et al, "Implementing Distributed Synthetic Forces Simulations in Metacomputing Enviroments", IEEE Proceedings of the Seventh Heterogenous Computing Workshop, pp. 29–42 (Mar. 1998).*
Waldspurger et al, "Spawn: A Distributed Computational Economy", IEEE Transactions on Software Engineering, pp. 103–117 (Feb. 1992).*
Gorton et al, "Enabling Software Shift Work with Groupware: A Case Study", IEEE Proceedings of the Twenty–Ninth Hawaii International Conference on system Sciences, vol. 3 pp. 72–81 (Jan. 1996).*
Wespi et al, "Utilizing Idle CPU Cycles in A Distributed Computing System", Proceedings of the IEEE 1997 National Aerospace and Electronics Conference, pp. 173–180 (Jul. 1997).*

* cited by examiner

Primary Examiner—Kevin J. Teska
Assistant Examiner—Samuel Broda
(74) Attorney, Agent, or Firm—Oliff & Berridge, PLC.

(57) ABSTRACT

The invention provides for a system and method for performing parallel simulations. The system includes a plurality of processors separated into groups and locating the groups in mutually exclusive time zones. Processors of one time zone may be use processors of other time zones for parallel simulation tasks. The system also includes a network that couples the plurality of processors together. Thus, simulation tasks may be assigned and transmitted by any processor to any other processor via the network. The system may also include a parallel simulation coordination device which includes a memory, a controller, a network interface and a database interface. The parallel simulation coordination device may receive calls from callers that wish to register a processor to make the processor available for parallel simulation or calls to request a parallel simulation job. The parallel simulation coordination device authorizes the parallel simulation job bills the caller for performing the parallel simulation.

21 Claims, 13 Drawing Sheets

FIG. 3

| TEMPERATURES \ SUPPLY VOLTAGES | | | | |
|---|---|---|---|---|
| 10°C | 3.8 | 3.9 | 4.2 | |
| 15°C | 3.5 | 3.8 | 4.5 | |
| 22°C | 2.5 | 3.0 | 3.6 | |
| ... | | | | ⋮ |

202 → (temperatures column)
204 → (supply voltages row)

FIG. 5

| | 602 | 604 | 606 | 608 | 610 | 612 | 614 | 616 | |
|---|---|---|---|---|---|---|---|---|---|
| | Processor Identification | Routing Information | Available Resources | Usable Periods | Secondary Distributor | Maintenance Schedule | Cost | Processor Speed | |
| 104 | Patmos | | | | | | | | • |
| 120 | JHAVEN | Accessible Via Networks 312 and 314 | 150 Mb disk 48 Mb RAM c-compiler p-spice simulator | 8PM–5AM JAPAN TIME 2% loaded | Yes: Terminals 122–138 | First Saturday of Every Month | $0.50/min. | Pentium 300 MHz | • |
| 138 | KASBY | | | | | | | | |

600

DEVICE AND METHOD FOR PARALLEL SIMULATION

This Application is related to U.S. Patent Application entitled "DEVICE AND METHOD FOR PARALLEL SIMULATION TASK GENERATION AND DISTRIBUTION" filed on even date herewith by the same inventor under common assignees and the subject matter is incorporated herein by reference.

BACKGROUND OF THE INVENTION

1. Field of Invention

This invention relates to a method and apparatus for generating and distributing simulation tasks for parallel simulation.

2. Description of Related Art

Parallel simulation is commonly used to increase simulation speed and thus improve simulation turn around time. One type of parallel simulation takes advantage of multiple processors to perform independent simulations of the same entity where each of the processors simulate the entity using different simulation parameters. For example, in circuit simulation, it is often necessary to simulate the circuit using various power supply voltages and circuit temperatures. Instead of using a single processor to serially perform the independent circuit simulations, multiple processors are used to perform the simulations in parallel and thus shorten the time required to obtain simulation results. In such a parallel simulation environment, every assistance to the user may further reduce the amount of time required to achieve a total simulation task. Thus, new technology is needed to further enhance the parallel simulation environment to optimally reduce simulation turn around times.

SUMMARY OF THE INVENTION

The invention provides for a system and method for performing parallel simulations. The system includes a plurality of processors separated into groups and locating each of the groups in mutually exclusive time zones. The groups may also be located in a single physical place but allocated to mutually exclusive time zones for different purposes, one of which may be for parallel simulation. If each of the time zones corresponds to regular working hours for an associated geographic location, then processors of one group would be most likely idle while processors of other groups are more heavily loaded supporting tasks during working hours. Thus, processors of other time zones may be used for parallel simulation tasks during working hours of a particular group of processors.

The system includes a network that couples the plurality of processors together. Thus, simulation tasks may be assigned and transmitted by any processor to any other processor via the network.

The system may also include a parallel simulation coordination device that coordinates parallel simulation jobs. The parallel simulation coordination device includes a memory, a controller, a network interface and a database interface. The parallel simulation coordination device receives calls from callers that wish to register a processor to make the processor available for parallel simulation. The parallel simulation coordination device collects information relating to the processor and stores the information in a database and issues to the caller an identification to be used when the caller wishes to execute a parallel simulation job.

The parallel simulation coordination device may also receive a call to perform a parallel simulation job. The parallel simulation coordination device validates an identification retrieved from the request and then retrieves information from the database that relates to the requested parallel simulation such as information for all the processors of other time zones. The retrieved information is transmitted to the caller and the caller assigns simulation tasks to the processors contained in the transmitted information and returns a list of the assigned processors to the parallel simulation coordination device. The parallel simulation coordination device sends authorizations to the processors in the list. After the simulation tasks are completed, each of the processors returns to the parallel simulation coordination device the actual processor use times so that the parallel simulation coordination device may bill the caller and credit the respective processor for performing the simulation tasks.

BRIEF DESCRIPTION OF THE DRAWINGS

The invention is described in connection with the following figures wherein like numerals reference like elements, and wherein:

FIG. 3 shows an exemplary matrix of values that may be used for parallel simulation of a circuit;

FIG. 5 is an exemplary diagram of a database of available processors;

DETAILED DESCRIPTION OF PREFERRED EMBODIMENTS

Figure 1:
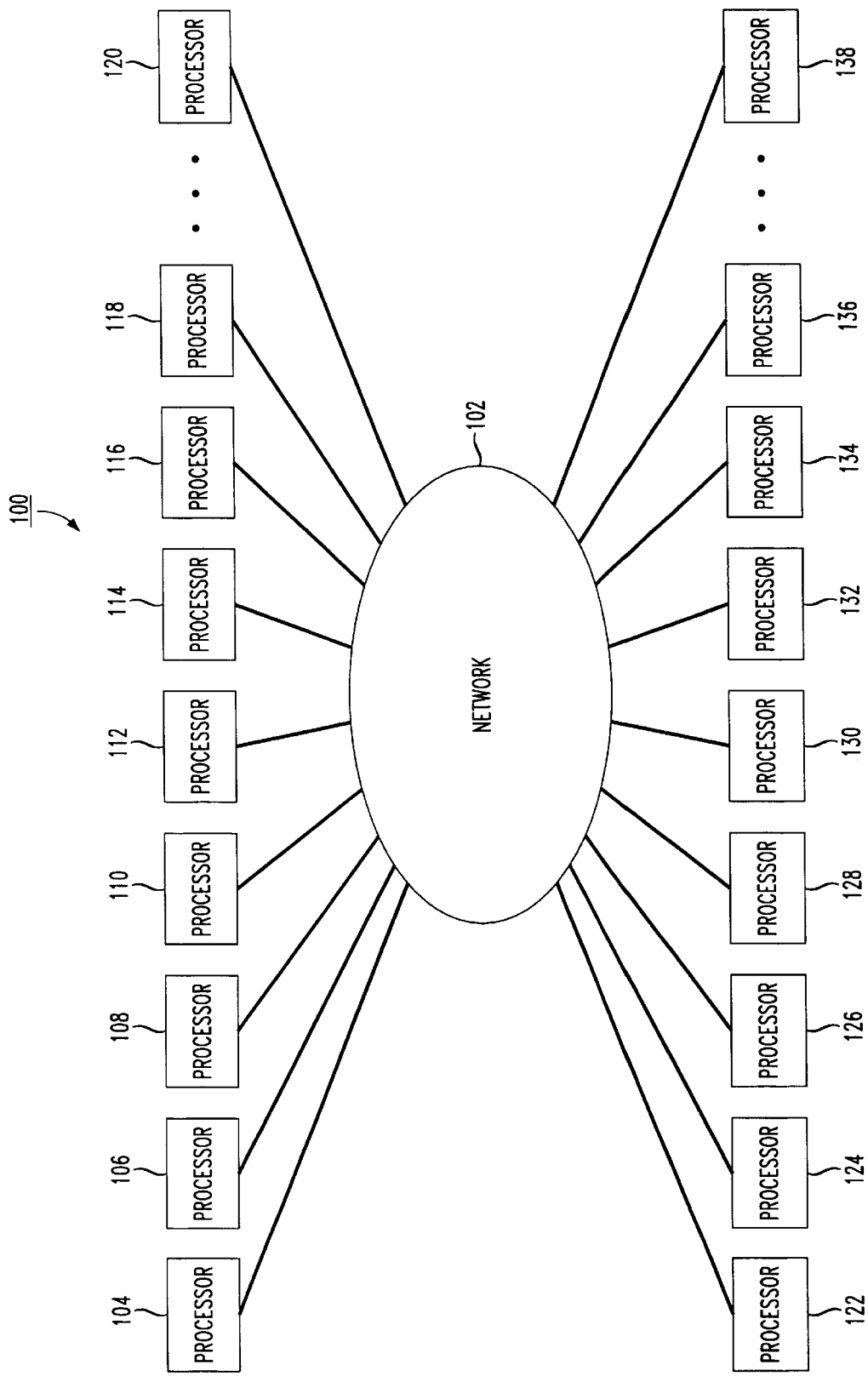
FIG. 1 is a block diagram of a plurality of processors interconnected through a network that may be used for parallel simulation.

FIG. 1 shows a system 100 of processors 104–138 interconnected via network 102. The processors 104–138 may be of different kinds such as servers, routers, workstations or personal computers, for example. The network 102 may be a single network or multiple networks interconnecting the processors 104–138.

When a user using the processor 104 launches parallel simulations of a circuit in the system 100, for example, a simulation task generator of the processor 104 may receive the parallel simulation request from a user and generate the required number of simulation tasks that correspond to the request. The simulation task generator may then allocate the simulation task to those processors 104–138 that are available and distribute those tasks throughout the system 100 so that the requested parallel simulation may be performed. The simulation results are returned to the simulation task generator, compiled and output to the user.

Figure 2:
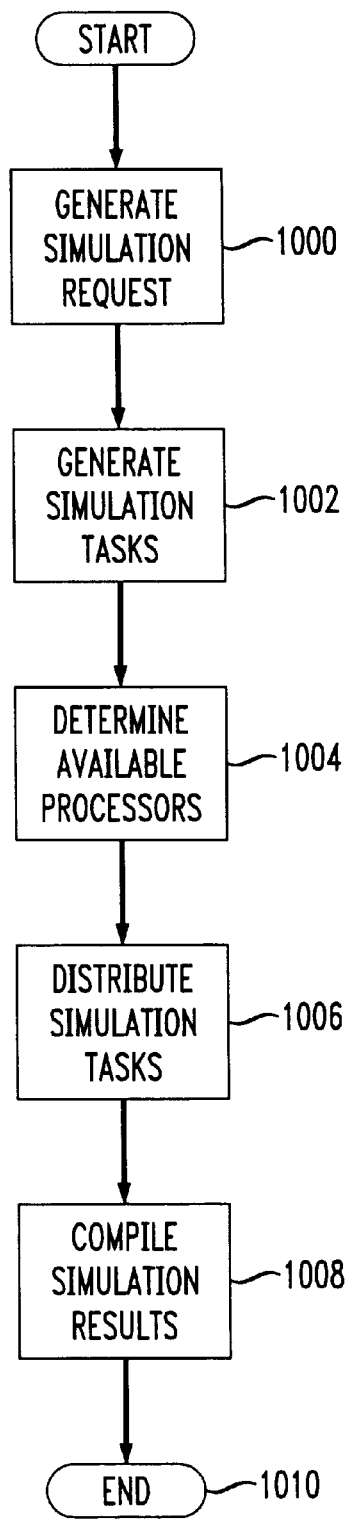
FIG. 2 is a flowchart for a parallel simulation process.

FIG. 2 shows a flowchart of a process for executing a parallel simulation. In step 1000, a simulation request is generated based on inputs from the user. The simulation request includes identification of at least one model of the entity to be simulated. For example, for circuit simulation, the simulation request includes an identification of at least one component or sub-circuit model and a net list that is to be simulated. As is well known in the art, models of other entities may also be simulated such as structural models of machines (airplanes, cars, etc. for vibrational analysis, for example), models of fluid flow, chemical models, electronic system models for cycle simulation, process models of factories, etc.

The simulation request also may include parameter values for which simulations are to be performed. For example, in FIG. 3, the user may input two sets of parameter values for supply voltages 204 and circuit temperatures 202. As shown in FIG. 3, simulation of the circuit is to be performed for 10° C. at supply voltage levels of 3.8, 3.9 and 4.2 volts; 15° C. at supply voltages of 3.5, 3.8 and 4.5 volts; and at 22° C. at supply voltages of 2.5, 3.0 and 3.6 volts. As indicated, more values may be specified than what is shown in FIG. 3.

For the FIG. 3 example, the parameters are provided in a matrix format where parameter values are explicitly specified. However, a range of values of each parameter with increments throughout the range may also be specified. For example, the simulation request may specify supply voltages of between 2.5 and 4.5 volts in increments of 0.1 volts and temperatures of 10–25° C. in increments of 5° C. Default ranges and increments may also be supplied. Other methods for specifying simulation parameter values may also be used such as lists of parameter values and so on. If lists are used, for example, all combinations of the parameter values are simulated.

After the simulation request is generated in step 1000, the process goes to step 1002 where simulation tasks are generated by a simulation task generator. The simulator task generator generates simulation tasks based on the parameter ranges specified by the simulation request. For the parameter values shown in FIG. 3, the simulator task generator generates nine simulation tasks corresponding to all combinations of temperatures and supply voltages.

The amount of time a user must spend to perform parallel simulation is greatly reduced by automatically generating simulation tasks based on user input of parameter ranges. While the example shown in FIG. 3 only generates nine simulation tasks, circuit simulation may require hundreds, if not thousands, of simulation tasks. Thus, if all the simulation tasks are generated manually, a user would be required to spend a large amount of time preparing the simulation tasks before the parallel simulation can be performed. Accordingly, automatically generating the simulation task based on a simple user parameter specification significantly reduces the time required to obtain simulation results.

The simulation task generator first determines all the combinations implied by the user parameter specifications. For each combination, the simulation task generator estimates the amount of resources that may be required. The simulation task generator may assume that all the simulation tasks require the same amount of resources. In this case, the speed of simulation is completely dependent on the processor executing the simulation and the amount of resources (i.e., memory) available to the processor.

The simulator task generator may separately estimate required resources for each of the simulation tasks. For example, based on the amount of input data and output data extraction specifications, the amount of storage required to execute a specific task may be estimated. For cycle simulation, the number of simulation cycles and the size of the model are often good indicators of the amount of time that would be required for completing a simulation task using a particular processor.

The estimates may also be provided by the user based on the user experience of prior simulations. Such experience data may also be collected by the simulation task generator and saved in the database 316. The experience data may be normalized to a standard processor having a predetermined processor power (e.g., 300 MHz Pentium) and available resources (e.g., 100 Mbyte of RAM) or the experience data may be collected for each accessible processor 104–138. For functional simulations, for example, certain functions require more simulation power than others. Based on the input data provided, the user or historical data may provide a good estimate on the amount of processor power and resources required to achieve a particular simulation completion time.

Based on the above determinations, each of the combinations may be assigned a processor requirement rating such as a number between 1 and 10. A 1 may indicate low processor power requirement while a 10 may indicate that a very high processor would be required. Similar ratings may also be assigned for processor RAM, disk storage, etc. Also, the simulation task generator may indicate for each combination whether advantages may be gained by specialized processors such as digital signal processors (DSPs). Image processing, for example, may be more efficiently performed on DSPs as compared to general purpose processors. The simulation task generator generates a simulation task for each combination and incorporates the processor and resource requirements in terms of the above ratings, for example, with the data for the simulation task.

Figure 4:
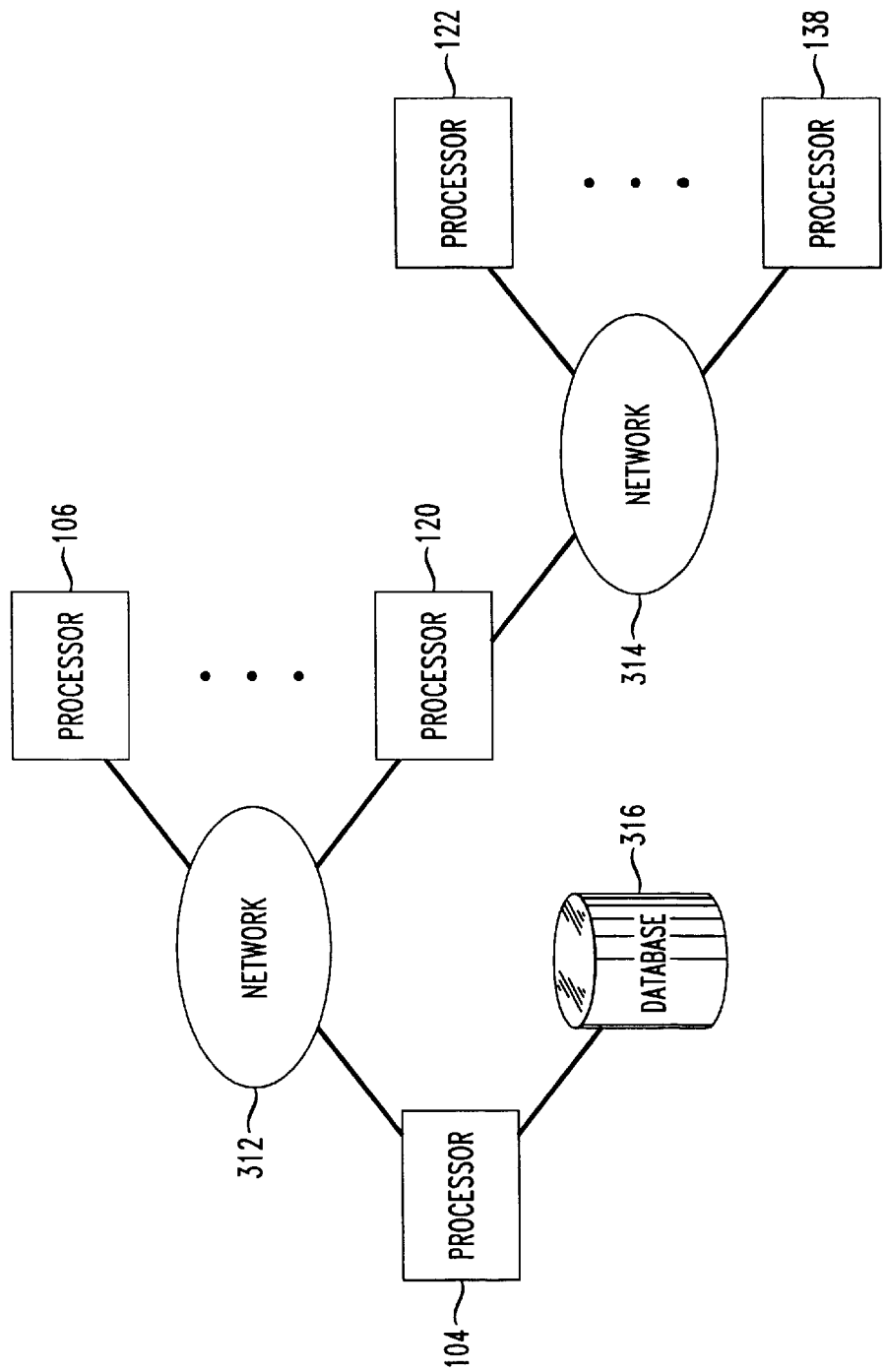
FIG. 4 is a block diagram of processors interconnected by networks.

After the simulation tasks are generated in step 1002, the process goes to step 1004 and determines which of the accessible processors are available to perform the parallel simulation. As shown in FIG. 4, the processors 104–138 may be distributed and interconnected by a number of networks such as networks 312 and 314. The simulation task generator must first determine which of the processors 104–138 are available for performing simulation tasks of the parallel simulation.

The availability of processors 104–138 may be determined in real time by querying each of the processors 104–138 before distributing the simulation tasks, for example. However, if the processors 104–138 are distributed over a wide geographical area, and if the network is congested at the time of the query, then such a query may consume a large amount of time. On the other hand, many processors have schedules similar to their respective users. For example, most processors are used as terminals and are heavily loaded during working hours of the user, but are mostly idle during non-working hours. Thus, if such schedule information are stored in the database 316, this information may be used to make simulation task distribution decisions instead of real time queries.

The simulation task generator may retrieve such information and determine which of the processors 104–138 are available for performing simulation tasks and, if the type of resources that are available at each of the processors 104–138 are also stored, then this information may also assist in allocating simulation tasks to the available processors. While FIG. 4 shows the database 316 connected to the processor 104, the database 316 may also be located elsewhere and accessible through the network such as network 312.

FIG. 5 shows an exemplary database format 600 for the database. The database 316 may include fields 602–614 which indicate information regarding each of the processors 104–138. For example, the processor 120 is identified as JHAVEN in the processor identification field 602. The routing information field 604 indicates that JHAVEN is accessible via networks 312 and 314. The available resources field 606 indicates that JHAVEN has 150 megabytes of disk space and 48 megabytes of RAM available for parallel simulation use.

Other types of resources such as processor type and speed and software modules such as P-Spice simulator and C compiler may also be indicated in this field. The usable periods field 608 indicates that JHAVEN is available between 8:00 p.m. and 8:05 a.m. Japan time and the processor is 2% loaded during this period. The secondary distributor field 610 indicates that JHAVEN has the capability for secondary distribution of simulation tasks and identifies the processors 122–138 as potential end points of the distribution. Thus, when the simulation task generator sends simulation tasks to processors 122–138, for example, JHAVEN may be used as a secondary distribution point where sub-ranges of simulation parameters may be sent to JHAVEN, and JHAVEN further expands the sub-ranges into simulation tasks and distributes these simulation tasks among the processors 122–138.

Many times processors are organized into domains where all the processors in a domain are tightly coupled by an intranet. In these circumstances, all the processors may easily access data from disk drives of any of the other processors of the domain. Thus, when down loading, simulation tasks assigned to any of the processors of the domain need only be stored in a disk of one of the processors and only pointers to the appropriate data need to be distributed to the processors that actually executed the simulation task. Thus, secondary distributor processors may be a processor of a domain that receives the data for the simulation tasks assigned to other processors of the domain.

Even for a domain type organization, the storage required to store files generated during the execution of a simulation task is best stored in a disk local to the executing processor. The data speed and volume requirement often exceed the capacity of intranets so that if the disk space of a secondary distributor is used for these purposes, the intranet often becomes a bottleneck and slows down the overall simulation process.

The maintenance schedule field 612 indicates that JHAVEN is taken down the first Saturday of every month for normal maintenance. Thus, during this time JHAVEN may not be reached. If JHAVEN is the only path to reach network 314 from the terminal 302, all the processors 122–138 are also not accessible during this period. The cost field 614 indicates that if JHAVEN was used, a cost of 50 cents per minute will be incurred. Other additional fields may also be added to indicate other pertinent information such as available programs native to the processor, other available devices connected to the processor such as high speed digital signal processors, etc.

The simulation task generator determines the availability of processors 104–138 and based on the power and resources of each available processor, allocates the simulation tasks to the processors 104–138 by matching available processors to process and resource ratings of each simulation task. For example, the simulation task generator may minimize overall elapsed simulation time by first assigning the highest processor power requirement simulation task with the most powerful available processor and estimate the amount of elapsed time for this simulation task. This elapsed time may serve as an average time window within which all other simulation tasks must also be completed. Thus, some slower available processors may be assigned a single simulation task that may be executed faster by other processors while some faster available processors may be assigned many lower processor requirement simulation tasks. Other task scheduling schemes may also be used that are known in the art. Similar logic may also be applied to resource requirements such as disk space and available processor RAM.

After the simulation tasks are allocated, the simulation task generator packages each of the simulation tasks into a package and distributes the packages to the various processors 104–138 or secondary processors that may serve as file servers for a domain for processing the simulation tasks. For example, those processors 104–138 that receive simulation tasks directly, are provided the specific parameter values, and identification of the simulator program that is used, the input data and the output data that is to be extracted. For those processors 104–138 that do not contain the required simulation program, the simulation task generator may also package the executable code necessary to accomplish each simulation, for example, so that the assigned processor is provided all the information necessary to perform the respective simulation tasks.

For processors such as processor 120 (JHAVEN), the packaged information may include sub-ranges of the parameter values so that the processor 120 may further generate simulation tasks and distribute those tasks accordingly to itself or any of the other processors 122–138 that are accessible to the processor 120. For example, processors 122–138 connected via the network 314 may be treated as a processor farm where many hundreds of processors 122–138 are interconnected in a local network.

After the simulation tasks are distributed in step 1006, the process goes to step 1008 and the simulation task generator monitors the simulation progress and compiles the simulation results as they are completed by the various processors 104–138. When all the results are compiled and the user alerted, the process goes to step 1010 and ends the parallel simulation.

Figure 6:
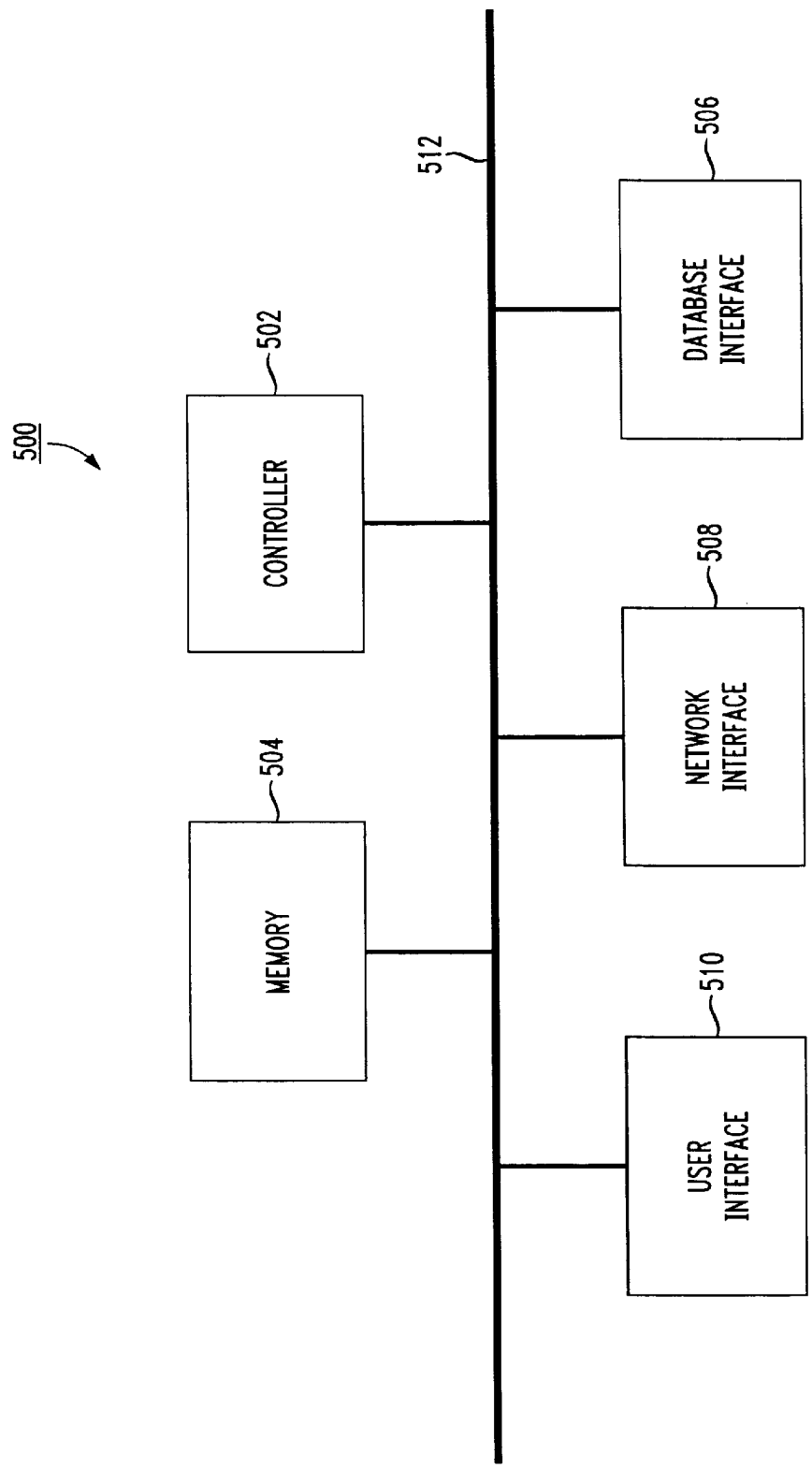
FIG. 6 is a block diagram of a processor used to launch parallel simulations.

FIG. 6 shows a diagram of a simulation task generator 500 which may be any of the processors 104–138, for example. The simulation task generator 500 includes a controller 502, a memory 504, a database interface 506, a network interface 508 and a user interface 510. The above components are coupled together via signal bus 512.

When a user prepares a simulation request through the user interface 510, for example, the controller 502 generates the request as instructed by the user which is well known in the art. The simulation request may also be prepared elsewhere and transferred to the simulation task generator 500. Assuming that the user request is stored in the memory 504, and an instruction is received by the controller 502 to begin a parallel simulation as directed by the request, the controller 502 determines the number and size of each of the simulation tasks as described earlier. For a simple circuit simulation, the amount of time and resources required may be almost identical for each of the individual simulation tasks. However, other types of simulation may result in different resources required for similar simulation tasks depending on the setting of the various parameter values.

After the simulation tasks are determined, the controller 502 retrieves information from the database 312 through the database interface 506. Based on the processors 104–138 that are available and the capabilities of each of the available processors, the controller 502 allocates the simulation tasks to the available processors, including taking advantage of secondary distributors, packages the simulation tasks, and distributes the packaged tasks through the network interface 508 to the available processors. After the simulation tasks are distributed, the controller 502 monitors the progress of each of the simulation tasks by either querying the processors to assess the simulation progress by retrieving the number of simulation cycles executed, for example. As the simulation tasks are completed, each of the processors 104–138 returns the simulation results to the controller 502 through the network interface 508 and the results are compiled by the controller 502 in the memory 504. When all the simulation tasks are completed and the results are compiled, the controller 502 indicates to the user through the user interface 510 that the parallel simulation is completed and provides access to the simulation results. The controller 502 may also display the results as they are being generated.

Figure 7:
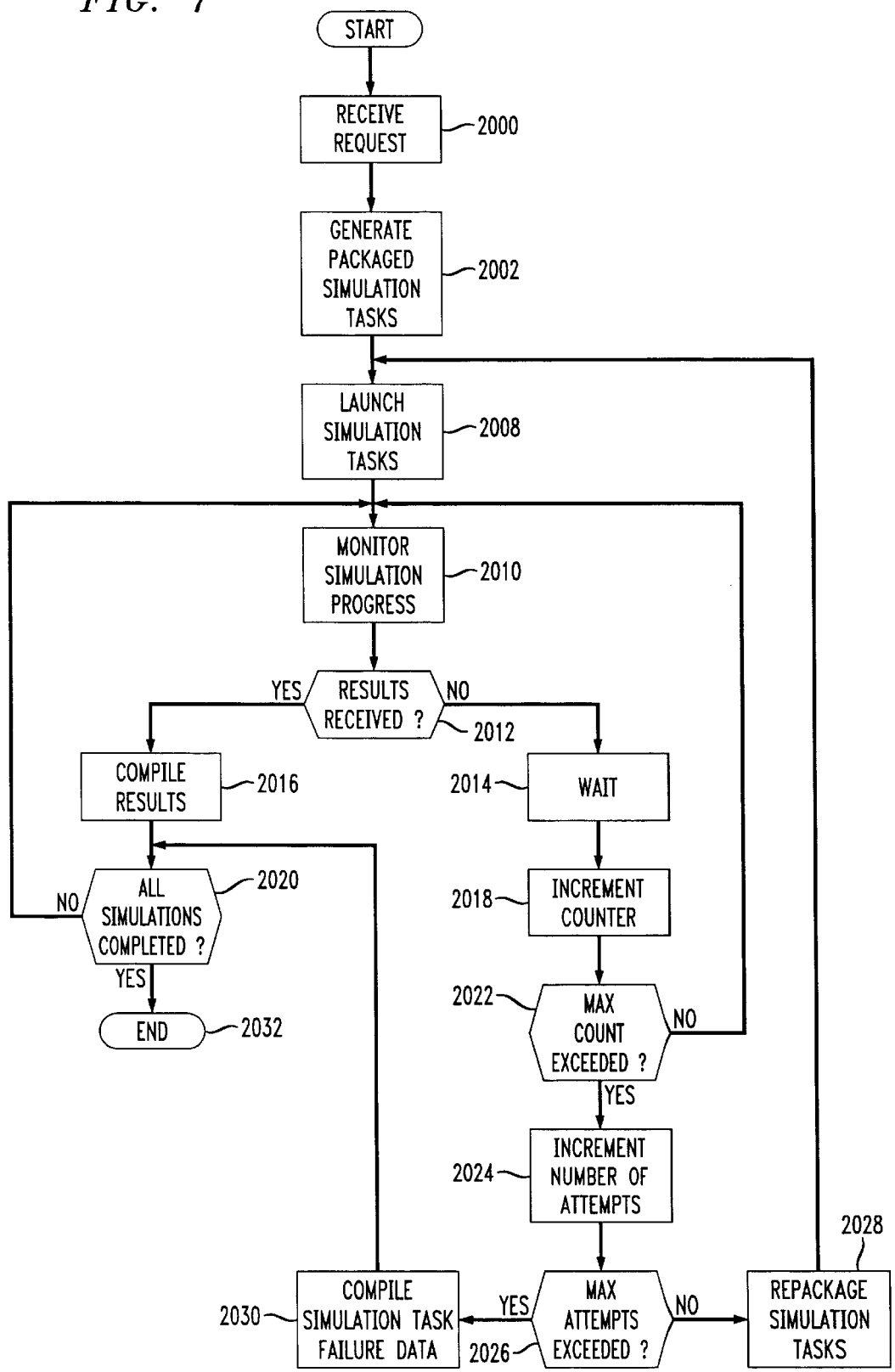
FIG. 7 is a flowchart of a process for launching parallel simulations.

FIG. 7 shows an exemplary flowchart of a parallel simulation process for the simulation task generator 500. In step 2000, the controller 502 receives the simulation request from the user and goes to step 2002. In step 2002, the controller 502 generates simulation tasks based on the information in the request by expanding the ranges into specific combination of parameter values or by generating subranges for secondary distributors. The controller 502 generates packages simulation tasks that are allocated to the available processors and goes to step 2008. In step 2008, the controller 502 launches the simulation tasks and goes to step 2010.

In step 2010, the controller 502 monitors the progress of each of the simulation tasks and goes to step 2012. In step 2012, the controller 502 determines whether results have been received from any of the simulation tasks. If results are received, the controller 502 goes to step 2016. Otherwise, the controller 502 goes to step 2014. In step 2016, the controller 502 compiles the received results and goes to step 2020. In step 2020, the controller 502 determines whether all the simulation tasks have been completed. A simulation task is completed if results are received or if the simulation task failed after a preset number of tries or after a preset amount of time has expired. If a simulation task failed, simulation task failure data is compiled for the user. If all the simulation tasks have been completed, the controller 502 alerts the user, goes to step 2032 and ends the parallel simulation process; otherwise, the controller 502 returns to step 2010. The controller 502 may also perform "clean up" operations before ending the process. For example, the controller 502 may delete temporary files and end all processes that have not ended. Also, any programs that were downloaded may also be deleted from storage(e.g., hard disk).

In step 2014, the controller 502 waits a predetermined amount of time and goes to step 2018. In step 2018, the controller 502 increments a counter and goes to step 2022. In step 2022, the controller 502 determines whether a maximum count has been exceeded. The maximum count may be set to a very large number such as an infinite value. If the maximum count has been exceeded, the controller 502 goes to step 2024; otherwise, the controller 502 returns to step 2010. In step 2024, the controller 502 increments the number of attempts to execute the simulation task and goes to step 2026. In step 2026, the controller 502 determines whether a maximum number of attempts has been exceeded for a particular simulation task. If exceeded, the controller 502 goes to step 2030 and compiles simulation task failure data and goes to step 2020. If the maximum number of attempts has not been exceeded, the controller 502 goes to step 2028. In step 2028, the controller 502 repackages the simulation tasks to allocate a different processor to perform the simulation task, for example, and goes to step 2008.

Figure 8:
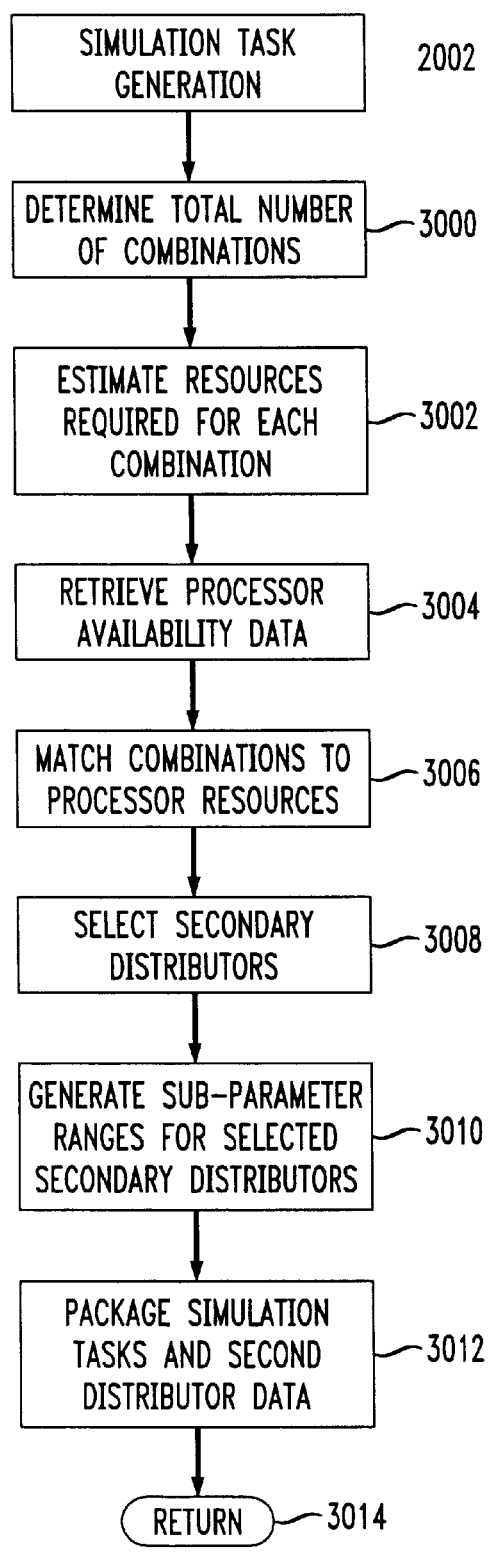
FIG. 8 is a flowchart of a simulator task generation process.

FIG. 8 shows the step 2002 of FIG. 7 in greater detail. In step 3000, the controller 502 determines the total number of combinations that is required by the user simulation request and goes to step 3002. In step 3002, the controller 502 estimates the resources that are required for each combination for a normalized simulation time. For example, based on the ratings discussed above, a particular simulation task may be estimated to require a processor rated at 5 and resources rated at 2. These ratings may be based on predetermined standards by which all the available processors are also similarly rated. After the estimates are completed, the controller 502 goes to step 3004.

In step 3004, the controller 502 retrieves processor availability data from the database 316, for example, and goes to step 3006. In step 3006, the controller 502 matches combinations of the processor power and available resources of each of the available processors with the estimated requirements for each simulation task. As discussed earlier, various schemes may be used to achieve this match based on a criterion such as minimum elapsed time of simulation. After the match is completed, the controller 502 goes to step 3008.

In step 3008, the controller 502 selects secondary distributors that may serve as file servers in a domain or generate secondary simulation tasks based on sub-ranges of parameter values extracted from the simulation request entered by the user. After the secondary distributors are selected, the controller 502 goes to step 3010. In step 3010, the controller 502 generates sub-ranges of parameter values for the selected secondary distributors and goes to step 3012. In step 3012, the controller 502 packages each of the simulation tasks and the secondary distributor data ready for distribution to the available processors. After the packaging tasks are performed, the controller 502 goes to step 3014 and returns control to step 2008 of FIG. 7.

While parallel simulation described above takes advantage of multiple processors to perform many simulation tasks concurrently, availability of processors 104–138 is not always assured. One common solution to processor availability is to provide large numbers of processors dedicated for such purposes so that fast turn arounds for parallel simulation tasks may be achieved. However, such a solution requires dedicated processors set aside for parallel simulation purposes.

In a preferred embodiment, processor use schedules are coordinated so that parallel simulation is achieved using normally "non-use" times of processors 104–138. For example, most processors in the world are used actively during daylight working hours and are either idle or turned off during night non-working hours. Thus, parallel simulation tasks may be executed during evening and night non-working hours when most users are off-work and their processors may be used for parallel processing. However, because parallel simulation is so effective, hundreds or thousands of simulation tasks may be executed in an amount of time corresponding to that required to execute a single simulation task. Thus, parallel simulation may produce more timely results if processors are available for parallel simulation during working hours. In view of the above, using processors in a single facility during evening and night non-working hours for parallel simulation tasks may still not provide simulation results in a timely manner.

Figure 9:
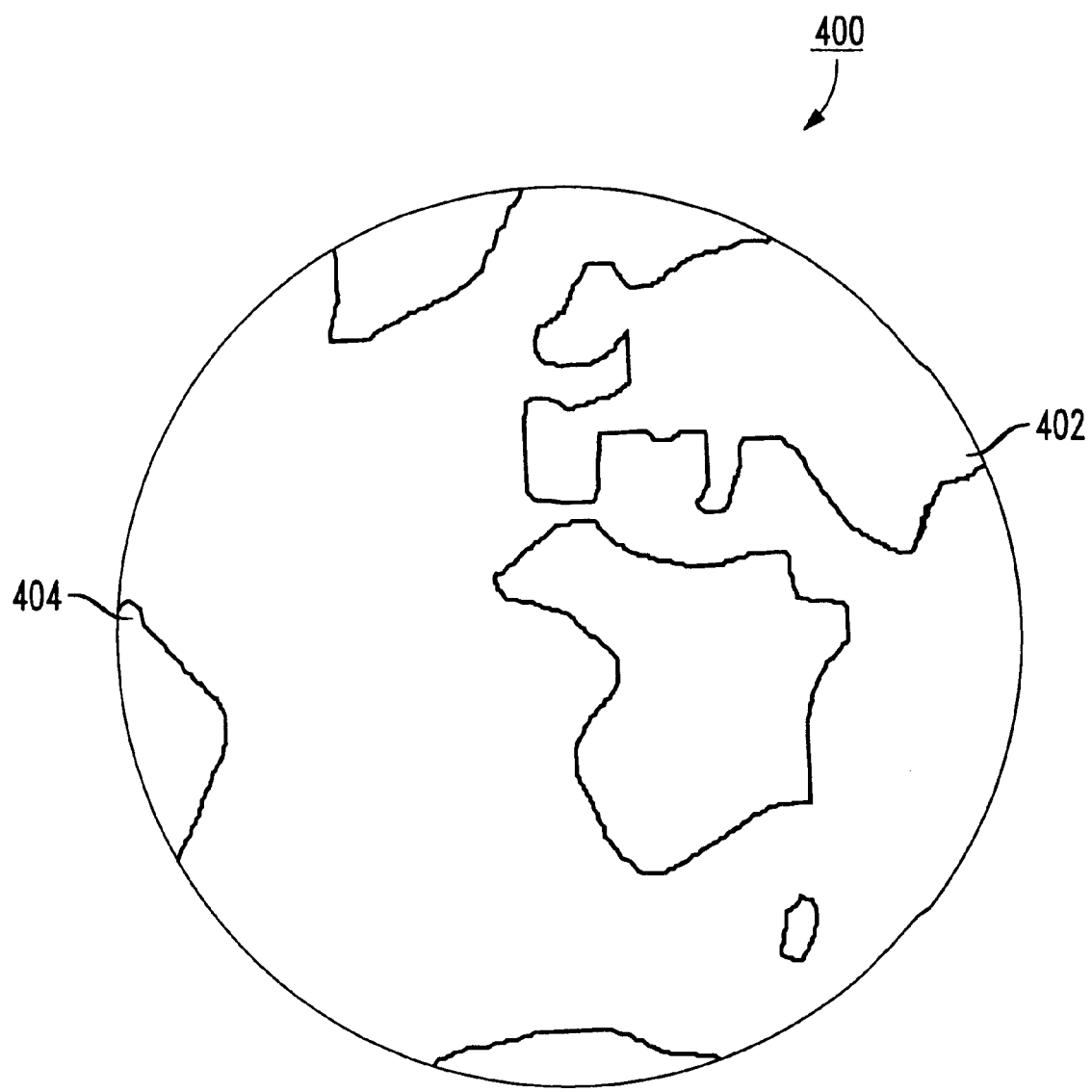
FIG. 9 shows possible locations of processors on a global basis.

FIG. 9 shows an exemplary picture of a globe 400 and two points 402 and 404 on opposite sides of the globe. As is well known, while the processors at location 402 are experiencing evening and night non-working hours, the processors at location 404 are experiencing daylight working conditions. Thus, if the processors on both sides of the globe 402 and 404 are interconnected and made available for parallel simulation, users at point 402 may perform parallel simulation using processors at point 404 during the daylight working hours at point 402 and vice versa for point 404 using processors located at point 402. By placing available processors in strategic geographical positions, parallel simulation may be achieved during normal daylight working hours without suffering a penalty of providing additional processors and without inconveniencing other users because of background simulation tasks.

The processors 702–724 may also be located in one geographical area but allocated to mutually exclusive time zones. For example, processors 702–724 may be located in one site in the United States, but allocated to different parts of the world such as Japan, for example. In such a case, users in Japan may be allocated a portion of the processors 702–724 during non-working hours in the United States for parallel simulation and the same processors 702–724 is allocated to users in the United States during U.S. working hours as terminals.

Locating processors as described above may be either explicitly or implicitly achieved. Multinational organizations commonly interconnect all of their processors in an intranet so that processors anywhere in the organization may easily communicate with other processors in the organization. Under these circumstances all the processors of an organization may be mapped according to time zones.

Figure 10:
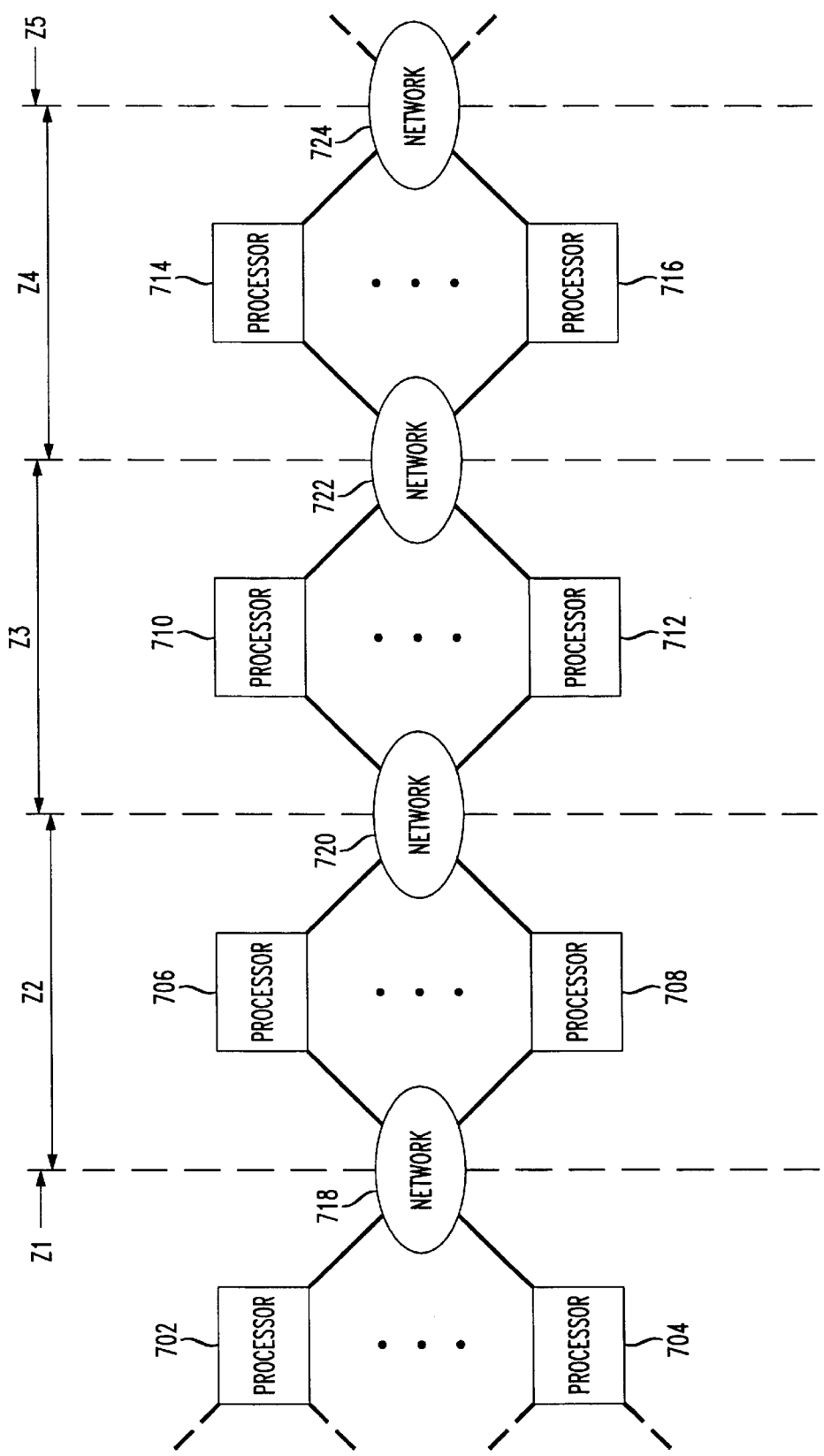
FIG. 10 is a diagram of processors located in different time zones and by networks.

FIG. 10 shows processors 702–724 interconnected via networks 718–724 located across many time zones Z1–Z5. If the time zones Z1–Z5 are each about ten hours apart, for example, then users of processors 702–704 in time zone Z1 may use processors 710–712 in time zone Z3 for parallel simulation. Similarly processors 706–708 in time zone Z2 may use processors 714–716 in time zone Z4 for parallel simulation and so on.

While processors of a single organization may be explicitly located in different time zones Z1–Z5 as described above, many processors are already located around the world in substantially all time zones Z1–Z5. In addition, most processors are interconnected via the Internet, for example, and are accessible to each other. Thus, in a preferred embodiment, a parallel simulation coordination system 800 is provided for owners of various processors around the world to offer their processor for parallel simulation by registering their processor with the parallel simulation coordination system 800.

Figure 11:
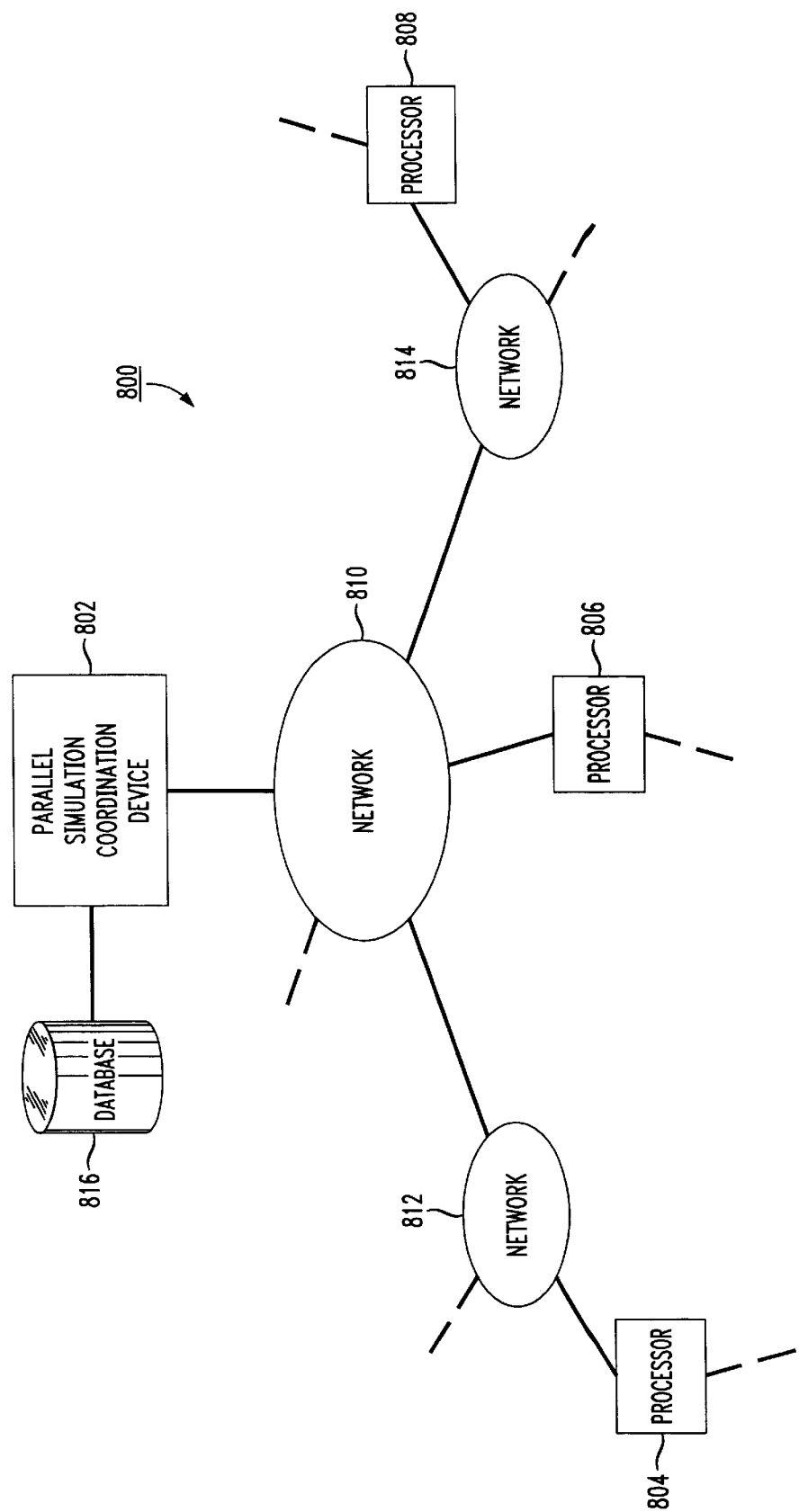
FIG. 11 is a diagram of a simulation coordination system.

FIG. 11 shows a diagram of the parallel simulation coordination system 800 which includes a parallel simulation coordination device 802 coupled to a network 810 which in turn is coupled to other networks 812 and 814 and processors such as processor 806. Other processors are coupled to the networks 812 and 814 such as processors 804 and 808, respectively. The parallel simulation coordination device 802 receives requests from the processors 804–808 to be registered as an available processor to execute parallel simulations. The parallel simulation coordination device 802 enters processors' identification, available resources, processing power, etc. in the database 816 similar to the database structure shown in FIG. 5. When a particular processor desires to perform parallel simulation, the processor would access the database 816 to determine which of the processors are available for parallel simulation.

The parallel simulation coordination device 802 may be a single centralized unit to coordinate all the processors around the world or may be distributed. For example, one such parallel simulation coordination device 802 may be located in each time zone Z1–Z5 and be responsible for collecting all the available processors in that time zone. All the parallel simulation coordination devices 802 around the world may then coordinate with each other and share information so that each of the parallel simulation coordination devices 802 may construct a database 816 that includes all the available processors around the world.

Because the above parallel simulation coordination system 800 is not restricted to a single organization, anyone in the whole world may take advantage of the processing power of the rest of the world to achieve parallel simulation tasks. Payment for the cost of simulation and the cost of services may be billed to the various users of the system to achieve parallel simulation. Owners of processors may be provided an incentive to register their processor by providing a payment for the amount of time their processor is used for executing parallel simulations, for example. The rate of payment may be adjusted based on processing power, available resources and the time of day the processor is being used for parallel simulation, for example.

Figure 12:
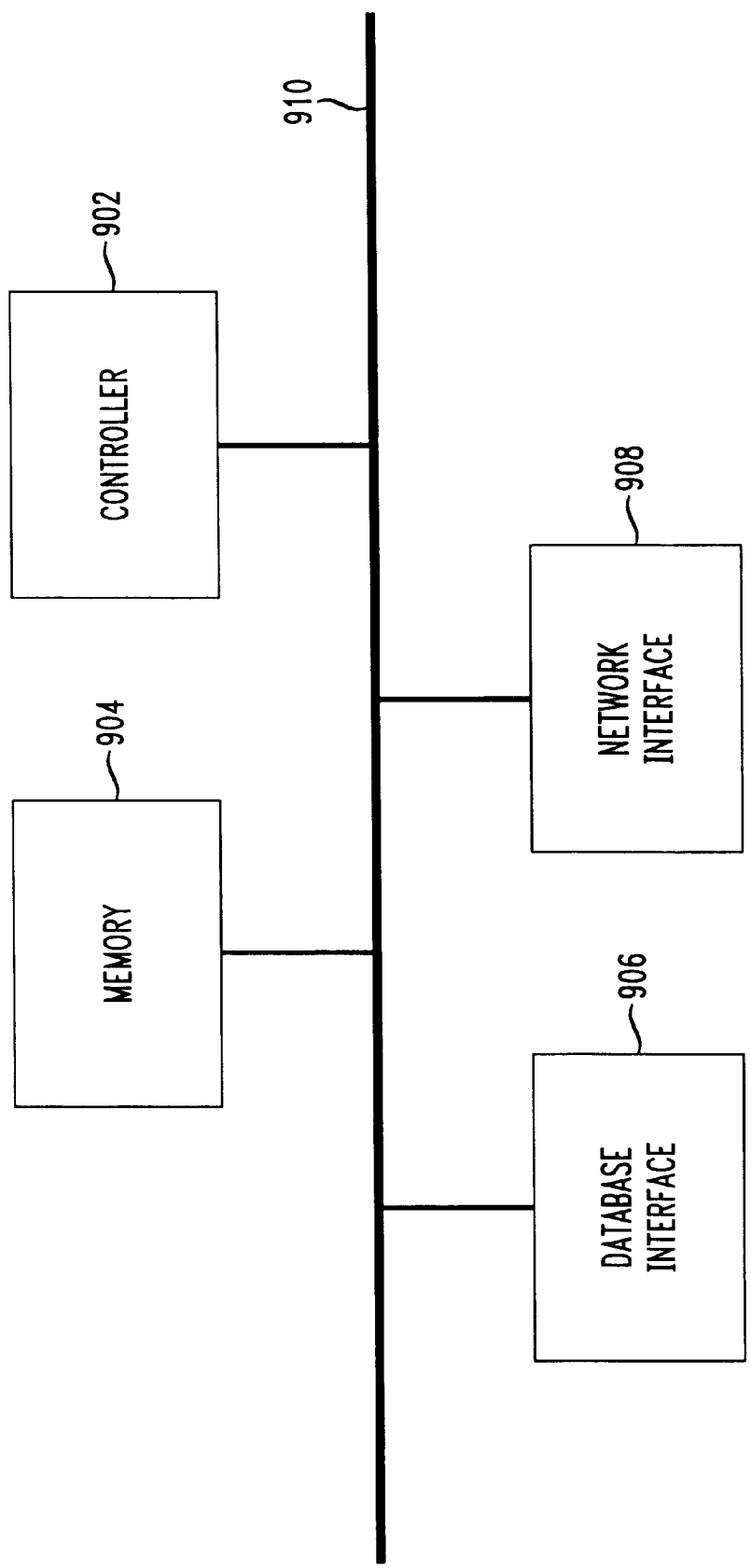
FIG. 12 is a block diagram of the simulation coordination system.

FIG. 12 shows an exemplary block diagram of the parallel simulation coordination device 802. The parallel simulation coordination device 802 includes a controller 902, a memory 904, a database interface 906 for interfacing to the database 816 and a network interface 908 for interfacing with the network 102. When a caller requests to enter a processor to be available as a parallel simulation processor, the controller 902 interacts with the caller through the network interface 908 to receive all the information required to complete an entry for the database 816 in the database format 600, for example. After all the information is received, the controller 902 updates the database 816 through the database interface 906 so that the new processor may be available for parallel simulation.

If a call is received to request information regarding available processors for parallel simulation, the controller 902 first requests an identification number from the caller. The identification number is issued to subscribers of the parallel simulation coordination system 800 so that system control and billing may be performed. After the identification is validated, the controller 902 retrieves from the request information related to the prospective parallel simulation such as the time zone needed and retrieves from the database 816 the information relating to all the processors that may be used for the requested parallel simulation and transmits the information to the caller (which may be a processor controlled by the caller).

The controller 902 then waits to receive a list of processors that the caller decides to use and transmits authorizations to each of the processors on the list and a corresponding authorization to the caller so that positive identification of a parallel simulation job is achieved. The caller then dispatches the simulation tasks and when each of the processors completes the simulation tasks assigned to it, a message is transmitted from each of the processors to the controller 902 through the network 102 that relates the amount of time consumed and resources used, for example. The controller 902 then bills the caller and credits an account corresponding to the processor for the tasks performed.

Figure 13:
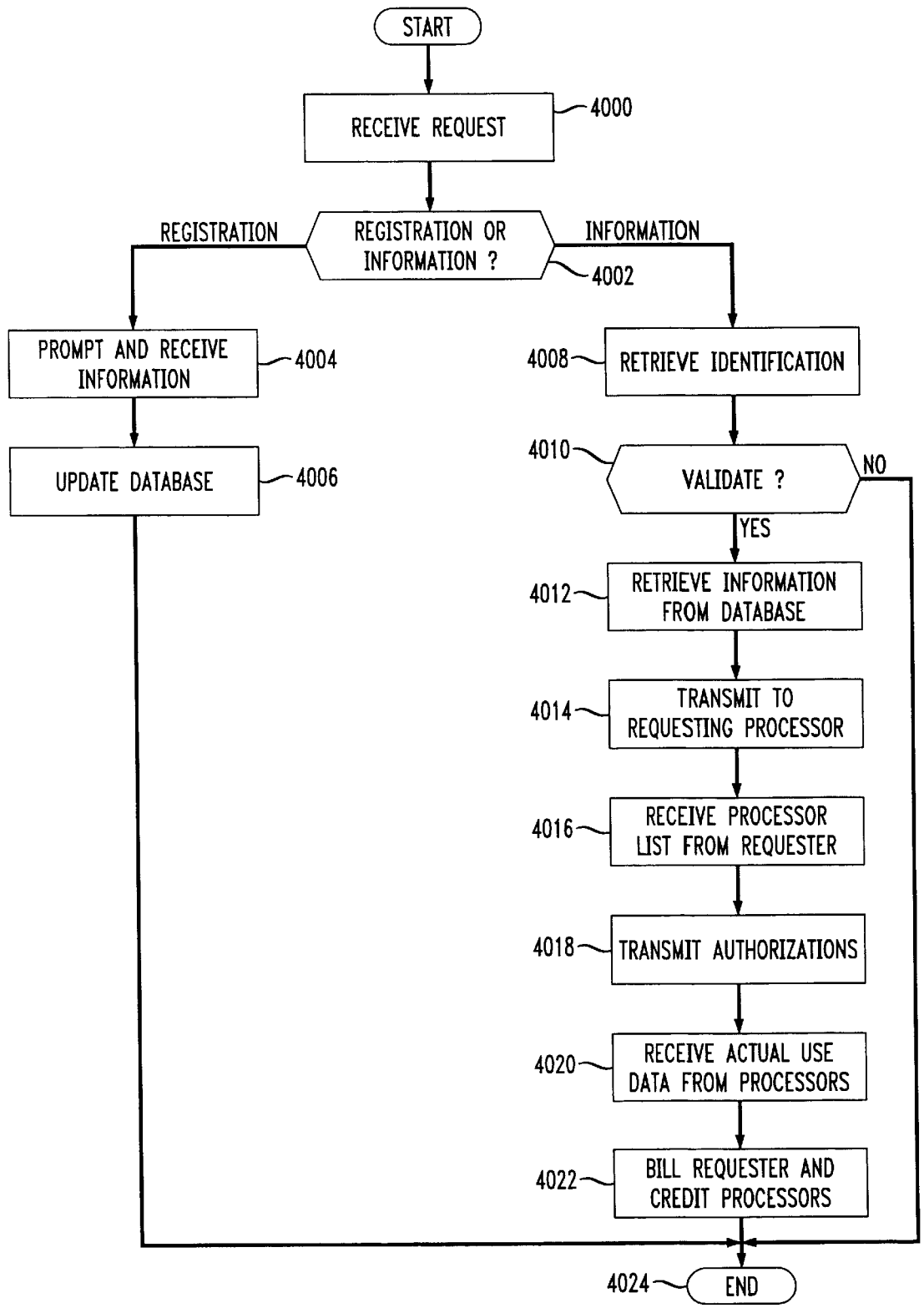
FIG. 13 is a flow chart of a process of the simulation coordination system.

FIG. 13 shows a flow chart for the process performed by the controller 902. In step 4000, the controller 902 receives a request from a caller and goes to step 4002. In step 4002, the controller 902 determines whether the caller desires to register a processor or to obtain information for a parallel simulation job. If the caller desires to register a processor, the controller 902 goes to step 4004; otherwise the controller 902 goes to step 4008.

In step 4004, the controller 902 prompts and receives information from the caller regarding the processor and goes to step 4006. In step 4006, the controller 902 updates the database 816 with the newly received information, provides the caller with a registration identification to be used when the caller wishes to perform parallel simulation, and goes to step 4024 and ends the process.

In step 4008, the controller 902 retrieves an identification from the caller's request and goes to step 4010. In step 4010, the controller 902 validates the identification. If the identification is valid (i.e., account is positive, for example), the controller 902 goes to step 4012; otherwise the controller 902 goes to step 4024 and ends the process. In step 4012, the controller 902 retrieves information from the database 816 relevant to the request such as information relating to all the processors within a requested time zone and goes to step 4014. In step 4014, the controller 902 transmits the retrieved information to the caller and goes to step 4016.

In step 4016, the controller 902 receives a list of processors from the caller that the caller wishes to use for parallel simulation and goes to step 4018. In step 4018, the controller 902 transmits authorizations to all the processors in the list and a corresponding authorization to the caller to arm all the processors for the prospective parallel simulation job and goes to step 4020. In step 4020, the controller 902 receives the actual use data from the processors that executed the parallel simulation and goes to step 4022. In step 4022, the controller 902 bills the caller for the cost of the parallel simulation and credits the processors in the list that successfully performed the respective simulation tasks and goes to step 4024 and ends the process.

While the above discussion is centered on parallel simulation where multiple independent simulations of a single model such as a circuit model is performed, the parallel usage of many processors may be applied to other applications as well. For example, performing spreadsheet tasks that may be divided into multiple independent spreadsheet tasks and executed on multiple processors concurrently; compiling code for a large program that may be executed on multiple processors and the results combined together via links; and processing of large image data that may be divided into frames to extract data from images such as a movie, are some examples. In this last example, each frame of the movie may be sent to an independent processor and the image processed, data returned, and the results of the processing of each frame may be compiled together to be reconstituted either into a new movie or the desired data may be extracted and provided to the user. Thus, the apparatus and method for parallel simulation may be applied to many other applications where parallel processes may be performed to achieve a single processing goal.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. A parallel simulation system, comprising:
   at least one network; and
   a plurality of processors interconnected by at least one network, the processors being separated into at least two groups and each of the groups physically located in different time zones so that working hours corresponding to the personnel of the groups are mutually exclusive, the processors of each of the groups performing independent parallel simulations of a same entity based on tasks that are distributed from processors of another group.

2. The parallel simulation system of claim 1, further comprising a database coupled to the network, the database including information corresponding to each of the processors.

3. The parallel simulation system of claim 2, wherein the information in the database includes at least one of a name of a processor, available resources of the processor, usable periods of the processor, a speed of the processor, routing information to the processor, a maintenance schedule of the processor, a cost of using the processor, and whether the processor may serve as a secondary processor.

4. The parallel simulation system of claim 3, wherein the available resources of the processor includes an amount of disk storage space, an amount of processor RAM, and identification of available software.

5. The parallel simulation system of claim 3, wherein the usable periods of the processor includes a time zone of the processor, and a period of time that the processor may be used for parallel simulation.

6. The parallel simulation system of claim 2, further comprising a parallel simulation coordination device coupled to the network and the database, the parallel simulation coordination device comprising:
   a memory;
   a network interface;
   a controller coupled to the memory and the network interface, the controller performing coordination tasks to support parallel simulation.

7. The parallel simulation system of claim 6, wherein the controller receives a request to register a processor into the parallel simulation system, the controller prompting and receiving information relating to the processor to be registered and updates the database with the received information.

8. The parallel simulation system of claim 7, wherein the information includes at least one of a name of a processor, available resources of the processor, usable periods of the processor, a speed of the processor, routing information to the processor, a maintenance schedule of the processor, a cost of using the processor, and whether the processor may serve as a secondary processor.

9. The parallel simulation system of claim 6, wherein the controller receives a request for parallel simulation, the controller retrieving an identification from the request and validating the identification, if the identification is valid, the controller retrieving from the database processor information relevant to the requested parallel simulation and transmitting the processor information to the caller.

10. The parallel simulation system of claim 9, wherein the controller receives a processor list from the caller and transmits authorization information to all processors on the list and transmits a corresponding authorization to the caller for the parallel simulation.

11. The parallel simulation system of claim 9, wherein the controller receives actual simulation use data from the processors on the list, bills the caller based on the use data and credits each of the processors based on the use data.

12. A method for operating a parallel simulation system, comprising:

utilizing at least one network;

interconnecting a plurality of processors by at least one network;

separating the plurality of processors into a plurality of groups;

locating the groups in mutually exclusive time zones; and performing independent parallel simulations of a same entity based on tasks that are distributed from processors of another group.

13. The method of claim 12, further comprising storing information corresponding to each of the processors in a database.

14. The method of claim 13, wherein the information in the database includes at least one of a name of a processor, available resources of the processor, usable periods of the processor, a speed of the processor, routing information to the processor, a maintenance schedule of the processor, a cost of using the processor, and whether the processor may serve as a secondary processor.

15. The method of claim 14, wherein the available resources of the processor includes an amount of disk storage space, an amount of processor RAM, and identification of available software.

16. The method of claim 14, wherein the usable periods of the processor includes a time zone of the processor, and a period of time that the processor may be used for parallel simulation.

17. The method of claim 13, further comprising:

receiving a request to register a processor into the parallel simulation system; and prompting and receiving information relating to the processor to be registered and updates the database with the received information.

18. The method of claim 17, wherein the information includes at least one of a name of a processor, available resources of the processor, usable periods of the processor, a speed of the processor, routing information to the processor, a maintenance schedule of the processor, a cost of using the processor, and whether the processor may serve as a secondary processor.

19. The method of claim 13, further comprising receiving a request for parallel simulation;

retrieving an identification from the request;

validating the identification, if the identification is valid, retrieving from the database processor information relevant to the requested parallel simulation; and transmitting the processor information to the caller.

20. The method of claim 19, further comprising:

receiving a processor list from the caller;

transmitting authorization information to all processors on the list; and transmitting a corresponding authorization to the caller for the parallel simulation.

21. The method of claim 19, further comprising:

receiving actual simulation use data from the processors on the list;

billing the caller based on the use data; and crediting each of the processors based on the use data.

\* \* \* \* \*